US012746982B2

(12) United States Patent
Hemphill et al.

(10) Patent No.: US 12,746,982 B2
(45) Date of Patent: Sep. 29, 2026

(54) POWERED VEHICLE TAILGATE ASSEMBLY HAVING A DOOR

(71) Applicant: Ford Global Technologies, LLC, Dearborn, MI (US)

(72) Inventors: Joshua Robert Hemphill, White Lake, MI (US); Joseph Prior, Detroit, MI (US); Michael Shawn Watterworth, Brighton, MI (US); Raul Ezequiel Alvarez Ruiz, Estado de Mexico (MX); Adrian Nania, Rochester, MI (US); Amol Borkar, Nagpur (IN)

(73) Assignee: Ford Global Technologies, LLC, Dearborn, MI (US)

(*) Notice: Subject to any disclaimer, the term of this patent is extended or adjusted under 35 U.S.C. 154(b) by 501 days.

(21) Appl. No.: 18/332,794

(22) Filed: Jun. 12, 2023

(65) Prior Publication Data

US 2024/0409166 A1 Dec. 12, 2024

(51) Int. Cl.

*B62D 33/027* (2006.01)
*B62D 33/03* (2006.01)
*E05F 1/10* (2006.01)

(52) U.S. Cl.

CPC ......... *B62D 33/0273* (2013.01); *B62D 33/03* (2013.01); *E05F 1/1033* (2013.01); *E05Y 2201/216* (2013.01); *E05Y 2600/46* (2013.01); *E05Y 2800/205* (2013.01); *E05Y 2800/36* (2013.01); *E05Y 2900/544* (2013.01)

(58) Field of Classification Search

CPC ................ B62D 33/0273; B62D 33/03; E05Y 2900/546

See application file for complete search history.

(56) References Cited

U.S. PATENT DOCUMENTS

| | | | | |
|---|---|---|---|---|
| 3,387,406 | A | 6/1968 | Coker et al. | |
| 8,348,325 | B2 * | 1/2013 | Hausler | B62D 33/0273 296/62 |
| 8,740,279 | B1 * | 6/2014 | McGoff | B62D 33/0273 49/168 |
| 9,540,859 | B2 | 1/2017 | Hansen | |
| 9,822,574 | B2 | 11/2017 | Heiberger et al. | |
| 10,308,291 | B2 * | 6/2019 | Seki | B62D 33/03 |

(Continued)

FOREIGN PATENT DOCUMENTS

| | | | |
|---|---|---|---|
| CN | 210217475 | U | 3/2020 |
| KR | 20020052333 | A | 7/2002 |

(Continued)

*Primary Examiner* — Gregory A Blankenship

(74) *Attorney, Agent, or Firm* — Vichit Chea; Carlson, Gaskey & Olds, P.C.

(57) ABSTRACT

A tailgate assembly includes a frame subassembly having a cargo bed access opening disposed between a driver side section and a passenger side section, and a door subassembly that is pivotably coupled to the frame subassembly. The door subassembly is pivotable relative to the frame subassembly back-and-forth between a door open position and a door closed position. The door subassembly closes the cargo bed access opening when the door subassembly is in the door closed position. The tailgate assembly further includes an actuator system that can pivot the door subassembly and the frame subassembly together back-and-forth between a tailgate closed position and a tailgate open position.

17 Claims, 4 Drawing Sheets

(56) References Cited

U.S. PATENT DOCUMENTS

| | | | | |
|---|---|---|---|---|
| 11,208,157 | B2 * | 12/2021 | Borkar | B62D 33/037 |
| 11,584,451 | B2 * | 2/2023 | Gibbs | B62D 33/03 |
| 11,618,509 | B2 | 4/2023 | Hemphill et al. | |
| 11,643,151 | B2 * | 5/2023 | Nania | B62D 33/0273 296/51 |
| 2003/0136595 | A1 | 7/2003 | Lacy | |
| 2004/0245064 | A1 * | 12/2004 | Schachtl | E05F 15/603 192/84.961 |
| 2004/0262939 | A1 * | 12/2004 | Miller | B62D 33/0273 296/50 |
| 2007/0132264 | A1 | 6/2007 | Koneval et al. | |
| 2008/0231067 | A1 | 9/2008 | Nagle | |
| 2009/0183433 | A1 * | 7/2009 | Cheung | B62D 33/0273 49/169 |
| 2012/0324793 | A1 * | 12/2012 | Abbasi | B62D 33/0273 49/168 |
| 2014/0265415 | A1 | 9/2014 | Wasser et al. | |
| 2017/0089116 | A1 * | 3/2017 | Heiberger | B62D 33/0273 |
| 2019/0277068 | A1 | 9/2019 | Nelsen et al. | |
| 2020/0131827 | A1 * | 4/2020 | Townson | E05F 1/1238 |
| 2021/0163082 | A1 * | 6/2021 | Borkar | B60R 3/02 |
| 2021/0221448 | A1 * | 7/2021 | Hung | B62D 33/0273 |
| 2022/0001728 | A1 * | 1/2022 | Nania | B62D 33/0273 |
| 2022/0056750 | A1 * | 2/2022 | Reif | B62D 33/0273 |
| 2022/0314889 | A1 * | 10/2022 | Glickman | B62D 33/0273 |
| 2022/0371667 | A1 * | 11/2022 | Hemphill | B62D 33/0273 |
| 2024/0367729 | A1 * | 11/2024 | Prior | B62D 33/0273 |
| 2024/0391537 | A1 * | 11/2024 | Prior | B62D 33/03 |
| 2024/0392604 | A1 * | 11/2024 | Prior | E05B 15/0006 |
| 2024/0409166 | A1 * | 12/2024 | Hemphill | B62D 33/0273 |
| 2024/0425000 | A1 * | 12/2024 | Lipp | H02G 1/08 |
| 2025/0033709 | A1 * | 1/2025 | Hemphill | B62D 33/0273 |
| 2025/0033711 | A1 * | 1/2025 | Prior | B62D 33/03 |
| 2025/0058844 | A1 * | 2/2025 | Chimento | B62D 65/024 |
| 2025/0115308 | A1 * | 4/2025 | Prior | B62D 33/0273 |
| 2025/0243699 | A1 * | 7/2025 | Miller | B62D 33/037 |
| 2025/0263963 | A1 * | 8/2025 | Minaker | B62D 33/0273 |

FOREIGN PATENT DOCUMENTS

| | | | |
|---|---|---|---|
| KR | 20130017493 | A | 2/2013 |
| WO | 2017006164 | A1 | 1/2017 |

* cited by examiner

POWERED VEHICLE TAILGATE ASSEMBLY HAVING A DOOR

TECHNICAL FIELD

This disclosure relates generally to a tailgate and, more particularly, to a powered tailgate having a door subassembly.

BACKGROUND

Many motor vehicles include cargo spaces for transporting various types of cargo. A pickup truck, for example, includes a cargo bed that establishes the cargo space of the truck. A tailgate typically encloses one end of the cargo bed. The tailgate is movable between closed and open positions for accessing the cargo bed.

SUMMARY

In some aspects, the techniques described herein relate to a tailgate assembly, including: a frame subassembly having a cargo bed access opening disposed between a driver side section and a passenger side section; a door subassembly that is pivotably coupled to the frame subassembly, the door subassembly pivotable relative to the frame subassembly back-and-forth between a door open position and a door closed position, the door subassembly closing the cargo bed access opening when the door subassembly is in the door closed position; and an actuator system that can pivot the door subassembly and the frame subassembly together back-and-forth between a tailgate closed position and a tailgate open position.

In some aspects, the techniques described herein relate to a tailgate assembly, further including a tube of the frame subassembly, the tube extending along an inboard side of the driver side section, along an inboard side of the passenger side section, and along a bottom of the cargo bed access opening.

In some aspects, the techniques described herein relate to a tailgate assembly, further including a torsion rod at least partially received within the tube, the torsion rod biased to assist a pivoting movement of the door subassembly and the frame subassembly from the tailgate open position to the tailgate closed position.

In some aspects, the techniques described herein relate to a tailgate assembly, further including at least one isolator that maintains a spacing between the torsion rod and the tube.

In some aspects, the techniques described herein relate to a tailgate assembly, wherein the tube extends continuously and uninterruptedly from the inboard side of the driver side section, along the bottom of the cargo bed access opening, and to the inboard side of the passenger side section.

In some aspects, the techniques described herein relate to a tailgate assembly, further including a clutch and a motor of the actuator system.

In some aspects, the techniques described herein relate to a tailgate assembly, wherein the clutch and the motor are both housed within the driver side section or both housed within the passenger side section.

In some aspects, the techniques described herein relate to a tailgate assembly, wherein the clutch has a clutch axis of rotation and the motor is configured to rotate about a motor axis of rotation that is offset from the clutch axis of rotation.

In some aspects, the techniques described herein relate to a tailgate assembly, wherein, when the frame subassembly and the door subassembly are in the tailgate closed position, the clutch and the motor are vertically offset from one another.

In some aspects, the techniques described herein relate to a tailgate assembly, wherein the clutch is vertically above the motor when the frame subassembly and the door subassembly are in the tailgate closed position.

In some aspects, the techniques described herein relate to a tailgate assembly, wherein the frame subassembly and the door subassembly pivot together about a horizontally extending axis, wherein the door subassembly pivots relative to the frame subassembly about a vertically extending axis.

In some aspects, the techniques described herein relate to a tailgate actuating method, including: powering an actuator system to pivot a tailgate assembly back-and-forth between tailgate closed position and a tailgate open position, the tailgate assembly including a frame subassembly and a door subassembly pivotably coupled to the frame subassembly, the frame subassembly having a cargo bed access opening disposed between a driver side section and a passenger side section, the door subassembly pivotable relative to the frame subassembly back-and-forth between a door open position and a door closed position, the door subassembly closing the cargo bed access opening when the door subassembly is in the door closed position.

In some aspects, the techniques described herein relate to a tailgate actuating method, further including connecting a driver side section of the frame subassembly to a passenger side section of the frame subassembly using a tube.

In some aspects, the techniques described herein relate to a tailgate actuating method, further including assisting the pivoting of the tailgate assembly using a torsion rod that is at least partially disposed within the tube.

In some aspects, the techniques described herein relate to a tailgate actuating method, wherein the driver side section is on a driver side of the cargo bed access opening in the tailgate assembly, and the passenger side section is on a passenger side of the cargo bed access opening.

In some aspects, the techniques described herein relate to a tailgate actuating method, wherein the frame subassembly and the door subassembly are pivotable together using the actuator system back-and-forth between the tailgate closed position and the tailgate open position.

In some aspects, the techniques described herein relate to a tailgate actuating method, wherein the frame subassembly and the door subassembly pivot together about a horizontally extending axis, wherein the door subassembly pivots relative to the frame subassembly about a vertically extending axis.

In some aspects, the techniques described herein relate to a tailgate actuating method, wherein the actuator system includes a motor and a clutch that are vertically stacked when the frame subassembly and the door subassembly are in the tailgate closed position.

In some aspects, the techniques described herein relate to a tailgate actuating method, wherein the clutch and the motor are both housed within the driver side section or both housed within the passenger side section.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
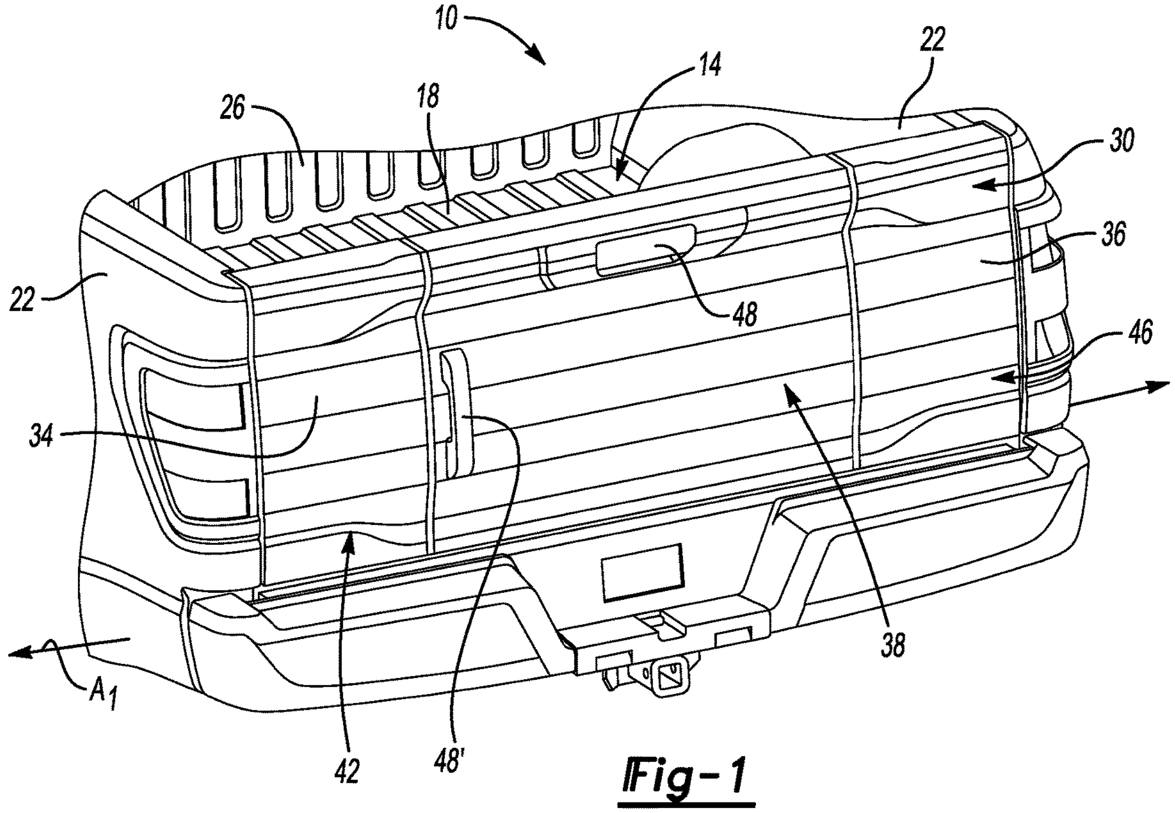
FIG. 1 is a rear perspective view of a motor vehicle equipped with a cargo space and a tailgate assembly positioned in a tailgate closed position relative to the cargo space.

This disclosure details exemplary powered tailgate assemblies. The tailgate assemblies can include a frame subassembly and a door subassembly that can pivot together about a horizontal tailgate axis. The door subassembly can also pivot relative to the frame assembly about a vertical door axis.

FIGS. 1, 2, 3, and 4 illustrate selected portions of a motor vehicle 10 that includes a cargo space for storing and/or hauling cargo. In the illustrated embodiment, the vehicle 10 is a pickup truck and the cargo space is established by a cargo bed 14 of the pickup truck. While a pickup truck with a cargo bed is specifically depicted and referenced herein, other vehicles having other types of cargo spaces could also benefit from the teachings of this disclosure. The vehicle 10 could be a conventional, internal combustion engine powered vehicle, a traction battery powered electric or hybrid vehicle, an autonomous vehicle (i.e., a driverless vehicle), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The cargo bed 14 is generally rearward of a passenger cabin (not shown) of the vehicle 10 and includes a floor 18 extending between a pair of longitudinally extending sidewalls 22, a laterally extending front wall 26, and a tailgate assembly 30. The overall size, shape, and configuration of the cargo bed 14 are not intended to limit this disclosure.

The tailgate assembly 30 can be considered a Multi-Axis Tailgate that includes, among other things, a frame subassembly 34 and a door subassembly 38. The frame subassembly 34, in the exemplary embodiment, includes a driver side section 42, a passenger side section 46, and a connection member (see FIG. 3) connected between the driver side section 42 and the passenger side section 46. The door subassembly 38 may sometimes be referred to as a "swing gate subassembly." The door subassembly 38 is pivotably connected to the passenger side section 46 and latches to the driver side section 42 when closed. At least one hinge assembly 54 is used to pivotably connect the door subassembly 38 to the passenger side section 46. In another example, the door subassembly 38 is pivotably connected to the driver side section 42 and latches to the passenger side section 46.

Figure 2:
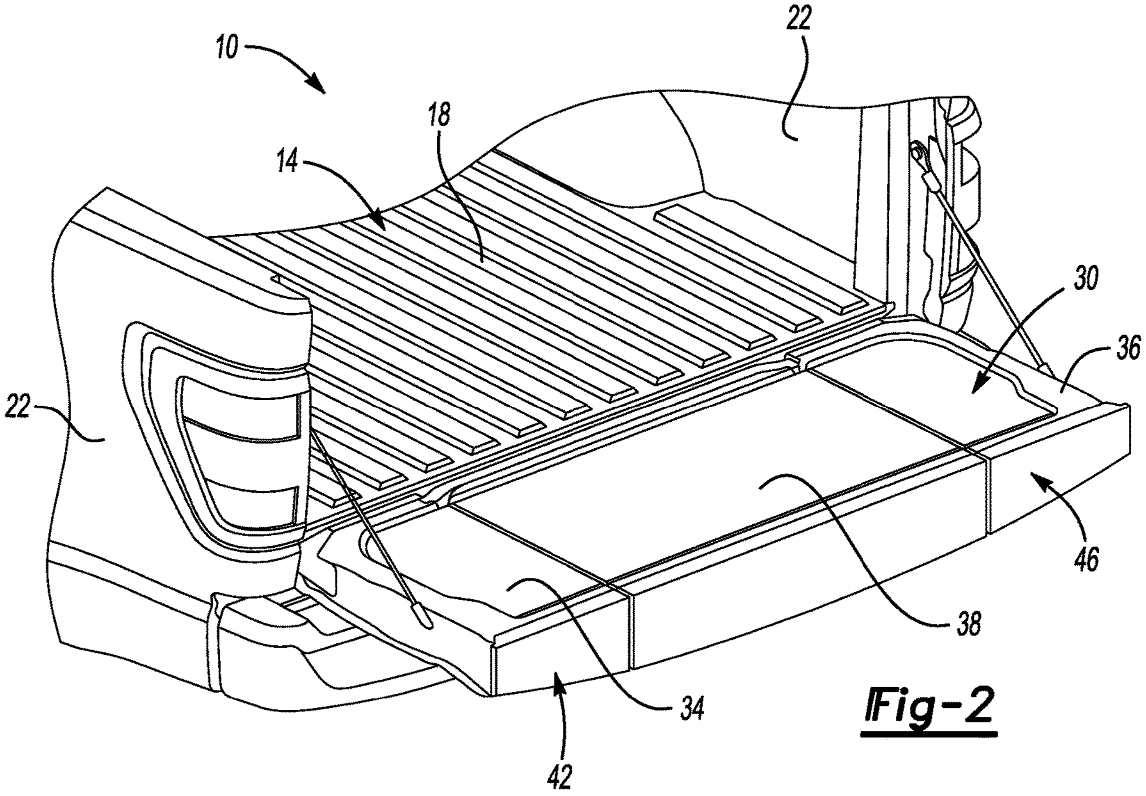
FIG. 2 illustrates the tailgate assembly of FIG. 1 in a tailgate open position.

The tailgate assembly 30 is pivotable about a first axis A1 relative to the cargo bed 14 back-and-forth between a tailgate closed position shown in FIG. 1 and a tailgate open position shown in FIG. 2. The tailgate assembly 30 may be moved from the tailgate closed position to the tailgate open position in response to actuating a first handle 48 of the tailgate assembly 30, for example. The tailgate assembly 30 is vertically aligned when in the tailgate closed position and thus generally encloses an end of the cargo bed 14 that is opposite from the front wall 26, and the tailgate assembly 30 is horizontally aligned when in the tailgate open position and thus generally allows access to the cargo bed 14. Vertical and horizontal, for purposes of this disclosure, are with reference to ground in the ordinary orientation of the vehicle 10 during operation.

The door subassembly 38 of the tailgate assembly 30 is in a door closed position and is latched to the frame subassembly 34 when the frame subassembly 34 and the door subassembly 38 are pivoted between the tailgate closed position and the tailgate open position. Thus, the frame subassembly 34 and the door subassembly 38 pivot together as a unit when the tailgate assembly 30 is transitioned back and forth between the tailgate closed position and the tailgate open position.

Figure 3:
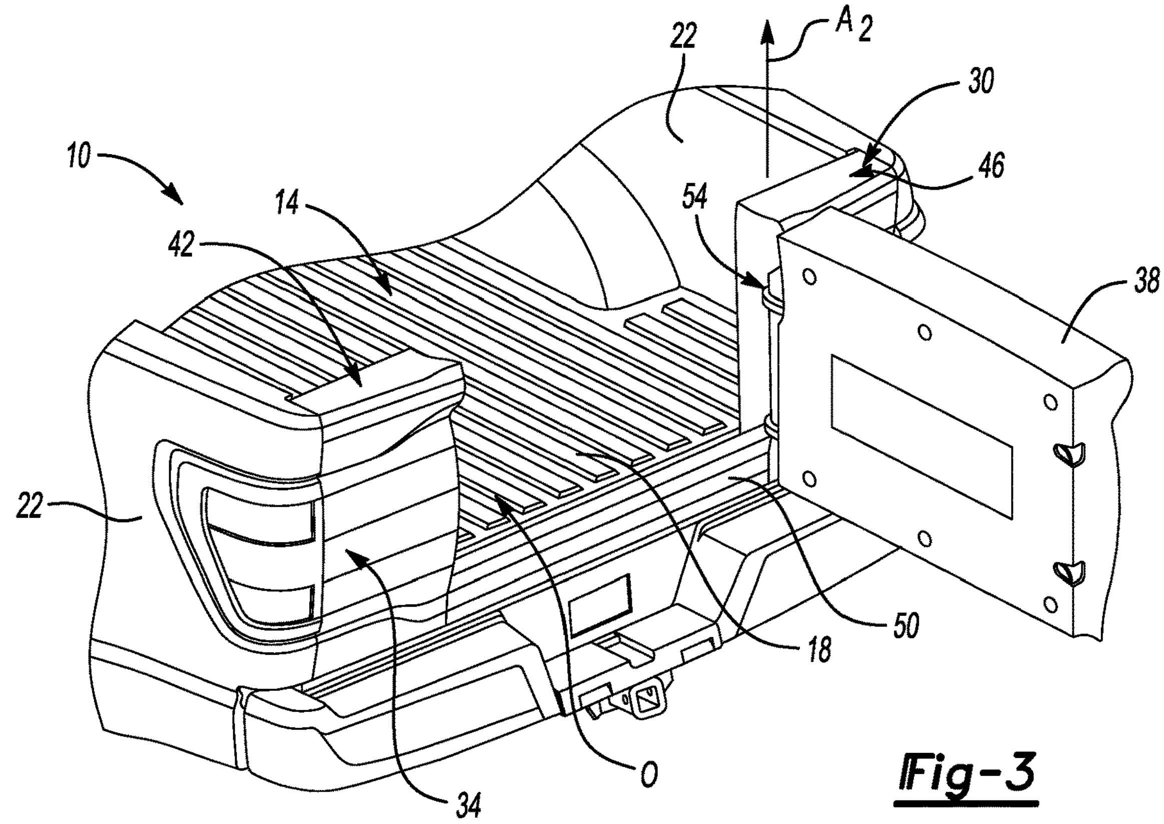
FIG. 3 illustrates a door subassembly of the tailgate assembly of FIG. 1 in a door open position.
Figure 4:
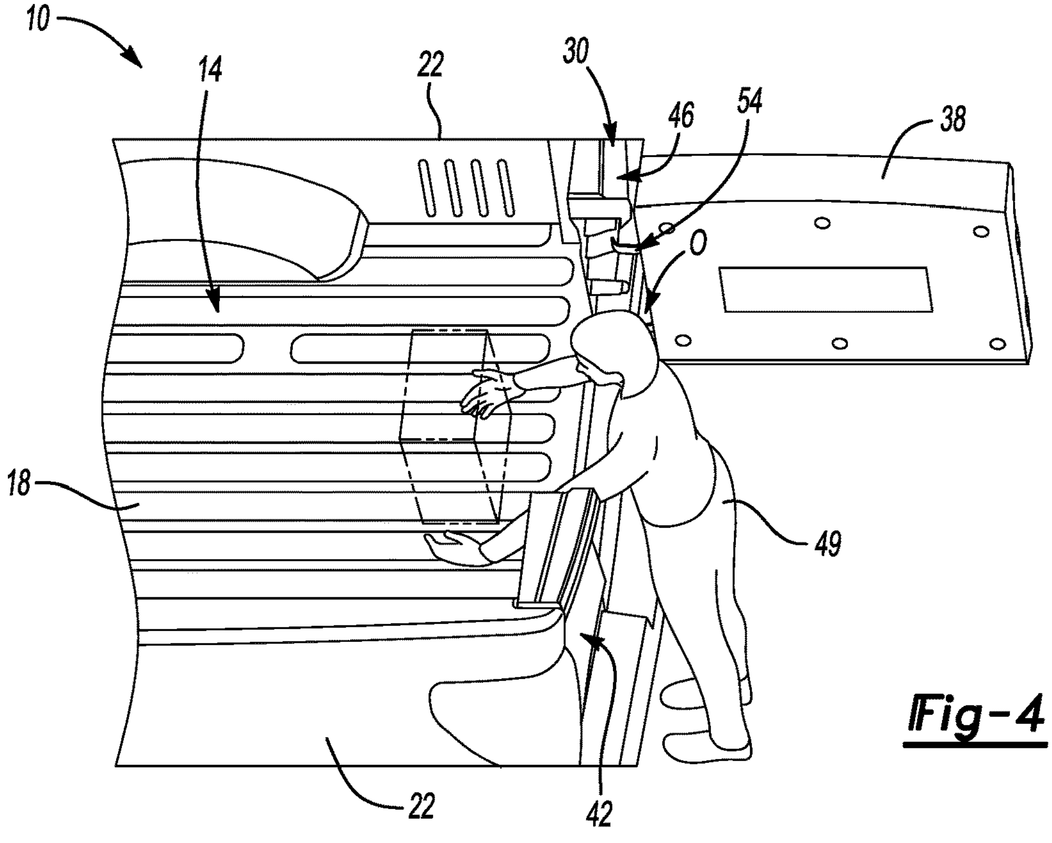
FIG. 4 is a rear and top view of the tailgate assembly and the door subassembly of FIG. 3.

When in the tailgate closed position, the door subassembly 38 is pivotable relative to the frame subassembly 34 about a second axis A2 between the door closed position shown in FIG. 1 and a door open position shown in FIG. 3. In an embodiment, the first axis A1 is a horizontally extending axis, and the second axis A2 is transverse to the first axis A1 and is a vertically extending axis. The door subassembly 38 may be moved between the door closed position and the door open position by grasping a second handle 48' (see FIG. 1) of the tailgate assembly 30, for example.

The door subassembly 38 provides a cargo bed access opening O when moved to the door open position. In an embodiment, the cargo bed access opening O extends vertically downward at least as far as the floor 18 of the cargo bed 14. A user 49 (see FIG. 4) can access the cargo bed 14 through the cargo bed access opening O when the door subassembly 38 is in the door open position. Placing the door subassembly 38 in the door open position allows the user 49 to move closer to the cargo bed 14 than, for example, when the tailgate assembly 30 is positioned in the tailgate open position of FIG. 2. The cargo bed access opening O can also provide clearance for the user 49 to enter the cargo bed 14 to either load or retrieve an item of cargo (see FIG. 4).

Figure 5:
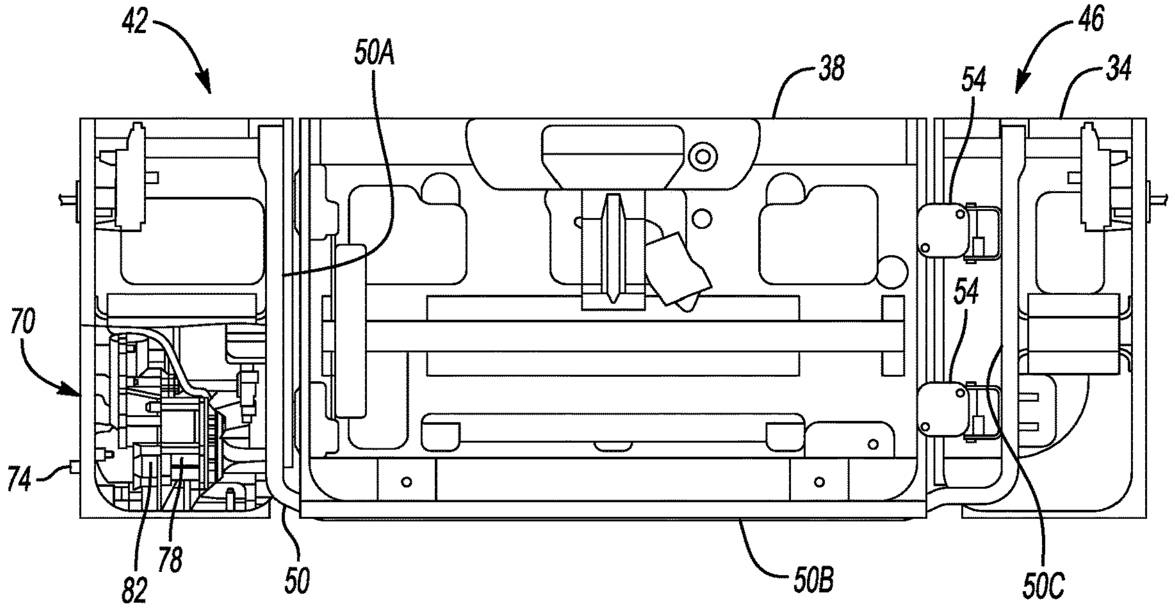
FIG. 5 is an inside view of the tailgate assembly of FIG. 1 with selected portions removed to show a tube.
Figure 6:
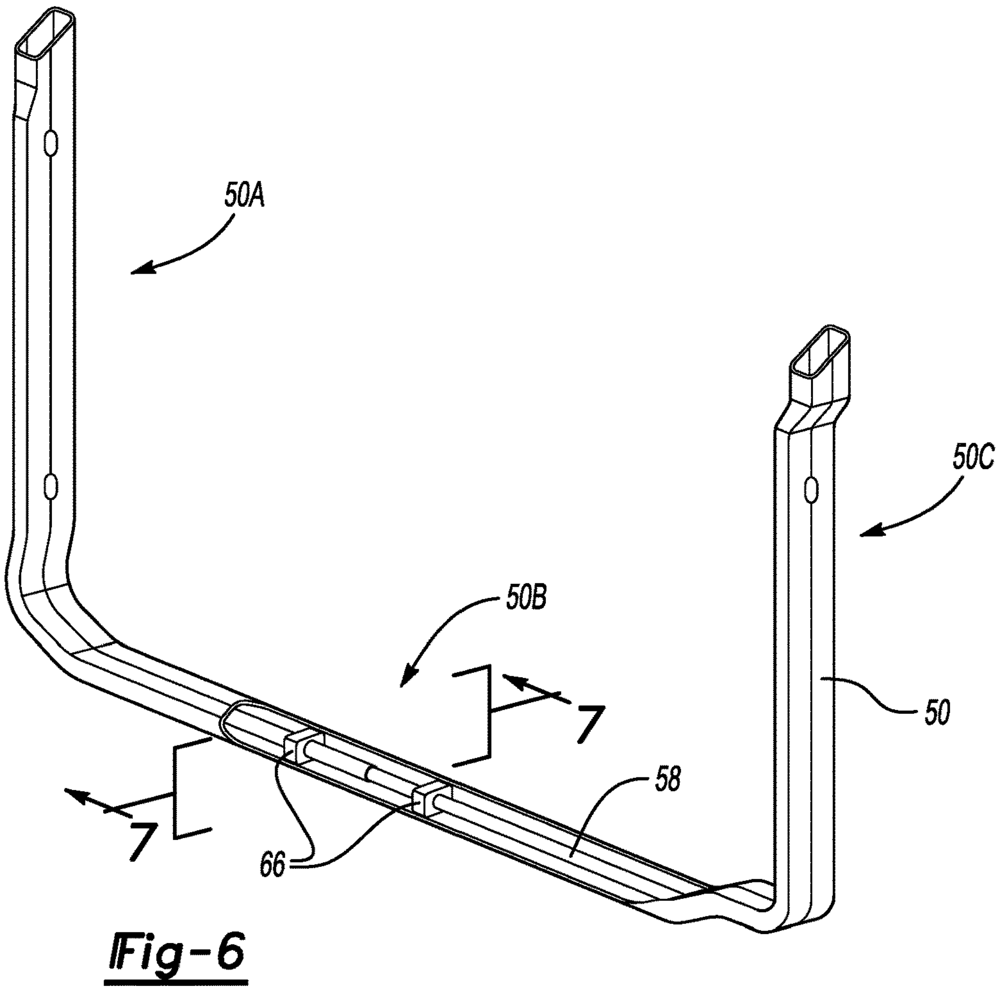
FIG. 6 is a perspective view of a tube from the tailgate assembly of FIG. 1.
Figure 7:
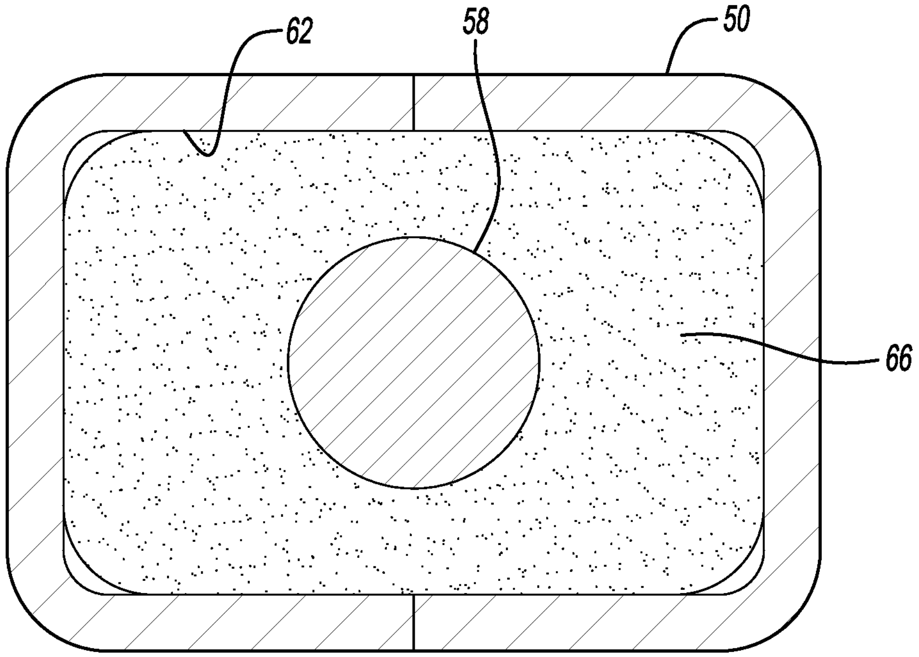
FIG. 7 is a section view taken at line 7-7 in FIG. 6.

With reference now to FIGS. 5-7 and continuing reference to FIGS. 1-4, the frame subassembly 34 includes a connection member provided by a tube 50 that is U-shaped in this example. The tube 50 includes a portion 50A extending along an inboard side of the driver side section 42, a portion 50C extending along a bottom of the cargo bed axis opening O, and a portion 50C extending along an inboard side of the passenger side section 46. The tube 50 extends continuously and uninterruptedly from the portion 50A, to the portion 50B, and to the portion 50C.

The bottom of the cargo bed axis opening O is a vertical bottom when the tailgate assembly 30 is in a closed position. Vertical, for purposes of this disclosure, is with reference to ground and an ordinary orientation of the vehicle 10 during operation.

The tube 50 houses a torsion rod 58 that is biased to assist the pivoting movement of the door subassembly 24 and the frame subassembly 22 about the axis A1. The torsion rod 58 is at least partially received within the tube 50 and is biased to assist the pivoting movement.

To facilitate positioning the torsion rod 58 within the tube 50, the tube 50 can be assembled from two separate pieces. The torsion rod 58 can be positioned, and the two pieces then joined to form the tube 50. Within the tube 50, the torsion rod 58 can be spaced from the inner surfaces 62 of the tube 50 with at least one isolator 66. The isolator 66 can maintain a spacing between the torsion rod 58 and the inner surfaces 62 of the tube 50. The isolator 66 can be rubber.

The tailgate assembly 30 includes an actuator system 70 that can pivot the tailgate assembly 30 (i.e., the door subassembly 38 and the frame subassembly 34) about the first axis A1 back and forth between the tailgate closed position shown in FIG. 1 and the tailgate open position shown in FIG. 2. To pivot the tailgate assembly 30, the actuator system 70 rotates relative to a pivot rod 74 that is rotatably fixed to the sidewall 22.

The actuator system 70, in this example, includes a clutch 78 and a motor 82. The motor 82 is activated to drive the pivot rod 74 through the clutch 78. The rotation can force the pivoting movement of the tailgate assembly 30.

The clutch 78 and the motor 82 are both housed within the driver side section 42 in this example. In another example, the clutch 78 and the motor 82 are both housed within the passenger side section 46.

In the exemplary embodiment, the clutch 78 and the motor 82 are stacked vertically atop one another when the tailgate assembly 30 is closed. In this particular example, the motor 82 is stacked above the clutch 78. As the clutch 78 and the motor 82 are stacked, the axis of rotation of the clutch 78 and the axis of rotation of the motor 82 are offset from each other.

Stacking the clutch 78 and the motor 82 reduces a required horizontal packaging footprint and facilitate the packaging of the actuator system 70 within the driver side section 34. Axially aligning the rotational axes would, as can be appreciated, require more horizontal or cross-vehicle packaging space.

Features of some of the disclosed examples include a actuator system that can be packaged within the driver's side section or the passenger side section of a frame subassembly of a tailgate. This provides adequate clearance for a door subassembly of the tailgate.

Another feature of some of the disclosed examples include packaging of a torsion rod within a tube of the frame assembly to provide assistance as the tailgate assembly is pivoted, but without interfering with a cargo bed axis opening.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A tailgate assembly, comprising:

a frame subassembly having a cargo bed access opening disposed between a driver side section and a passenger side section, the cargo bed access opening extending vertically downward at least as far as a floor of a cargo bed;

a door subassembly that is pivotably coupled to the frame subassembly, the door subassembly pivotable relative to the frame subassembly back-and-forth between a door open position and a door closed position, the door subassembly closing the cargo bed access opening when the door subassembly is in the door closed position;

an actuator system that can pivot the door subassembly and the frame subassembly together back-and-forth between a tailgate closed position and a tailgate open position;

a tube of the frame subassembly, the tube extending along an inboard side of the driver side section, along an inboard side of the passenger side section, and along a bottom of the cargo bed access opening;

a torsion rod at least partially received within a portion of the tube that extends along the bottom of the cargo bed access opening, the torsion rod biased to assist a pivoting movement of the door subassembly and the frame subassembly from the tailgate open position to the tailgate closed position; and at least one isolator that maintains a spacing between the torsion rod and the tube.

2. The tailgate assembly of claim 1, wherein the tube extends continuously and uninterruptedly from the inboard side of the driver side section, along the bottom of the cargo bed access opening, and to the inboard side of the passenger side section.

3. The tailgate assembly of claim 1, further comprising a clutch and a motor of the actuator system, wherein the clutch has a clutch axis of rotation and the motor is configured to rotate about a motor axis of rotation that is offset from the clutch axis of rotation.

4. The tailgate assembly of claim 3, wherein the clutch and the motor are both housed within the driver side section or both housed within the passenger side section.

5. The tailgate assembly of claim 3, wherein, when the frame subassembly and the door subassembly are in the tailgate closed position, the clutch and the motor are vertically offset from one another.

6. The tailgate assembly of claim 5, wherein the clutch is vertically above the motor when the frame subassembly and the door subassembly are in the tailgate closed position.

7. The tailgate assembly of claim 1, wherein the frame subassembly and the door subassembly pivot together about a horizontally extending axis, wherein the door subassembly pivots relative to the frame subassembly about a vertically extending axis.

8. The tailgate assembly of claim 1, wherein the at least one isolator is rubber and is disposed within the tube.

9. The tailgate assembly of claim 1, wherein the torsion rod extends through the at least one isolator such that a portion of the torsion rod is on a passenger side of the at least one isolator and a portion of the torsion rod is on a driver side of the at least one isolator.

10. A tailgate actuating method, comprising:

powering an actuator system to pivot a tailgate assembly back-and-forth between a tailgate closed position and a tailgate open position, the tailgate assembly including a frame subassembly and a door subassembly pivotably coupled to the frame subassembly, the frame subassembly having a cargo bed access opening disposed between a driver side section and a passenger side section, the door subassembly pivotable relative to the frame subassembly back-and-forth between a door open position and a door closed position, the door subassembly closing the cargo bed access opening when the door subassembly is in the door closed position, wherein a driver side section of the frame subassembly is connected to a passenger side section of the frame subassembly using a tube having a portion that extends along a bottom of the cargo bed access opening, the portion housing a torsion rod; and within the tube, maintaining a spacing between the torsion rod and inner surfaces of the tube using an isolator, wherein the isolator is interposed along the torsion rod between a passenger-side segment of the torsion rod and a driver-side segment of the torsion rod.

11. The tailgate actuating method of claim 10, further comprising assisting the pivoting of the tailgate assembly using the torsion rod that is at least partially disposed within the tube.

12. The tailgate actuating method of claim 10, wherein the frame subassembly and the door subassembly are pivotable together using the actuator system back-and-forth between the tailgate closed position and the tailgate open position.

13. The tailgate actuating method of claim 12, wherein the frame subassembly and the door subassembly pivot together about a horizontally extending axis, wherein the door subassembly pivots relative to the frame subassembly about a vertically extending axis.

14. The tailgate actuating method of claim 10, wherein the actuator system includes a motor and a clutch that are vertically stacked when the frame subassembly and the door subassembly are in the tailgate closed position.

15. The tailgate actuating method of claim 14, wherein the clutch and the motor are both housed within the driver side section or both housed within the passenger side section.

16. The tailgate actuating method of claim 10, wherein the torsion rod extends through an aperture in the isolator.

17. A tailgate assembly, comprising:

a frame subassembly having a cargo bed access opening disposed between a driver side section and a passenger side section, the cargo bed access opening extending vertically downward at least as far as a floor of a cargo bed;

a door subassembly that is pivotably coupled to the frame subassembly, the door subassembly pivotable relative to the frame subassembly back-and-forth between a door open position and a door closed position, the door subassembly closing the cargo bed access opening when the door subassembly is in the door closed position;

an actuator system that can pivot the door subassembly and the frame subassembly together back-and-forth between a tailgate closed position and a tailgate open position;

a tube of the frame subassembly, the tube continuously and uninterruptedly along an inboard side of the driver side section, along an inboard side of the passenger side section, and along a bottom of the cargo bed access opening;

a torsion rod at least partially received within a portion of the tube that extends along the bottom of the cargo bed access opening, the torsion rod biased to assist a pivoting movement of the door subassembly and the frame subassembly from the tailgate open position to the tailgate closed position;

at least one isolator that maintains a spacing between the torsion rod and the tube; and a clutch and a motor of the actuator system, wherein the clutch has a clutch axis of rotation and the motor is configured to rotate about a motor axis of rotation that is vertically offset from the clutch axis of rotation, wherein the clutch is vertically above the motor when the frame subassembly and the door subassembly are in the tailgate closed position.

* * * * *